Inventor
WILLIAM T. LIVERMORE
By His Attorney
John J. Lynch

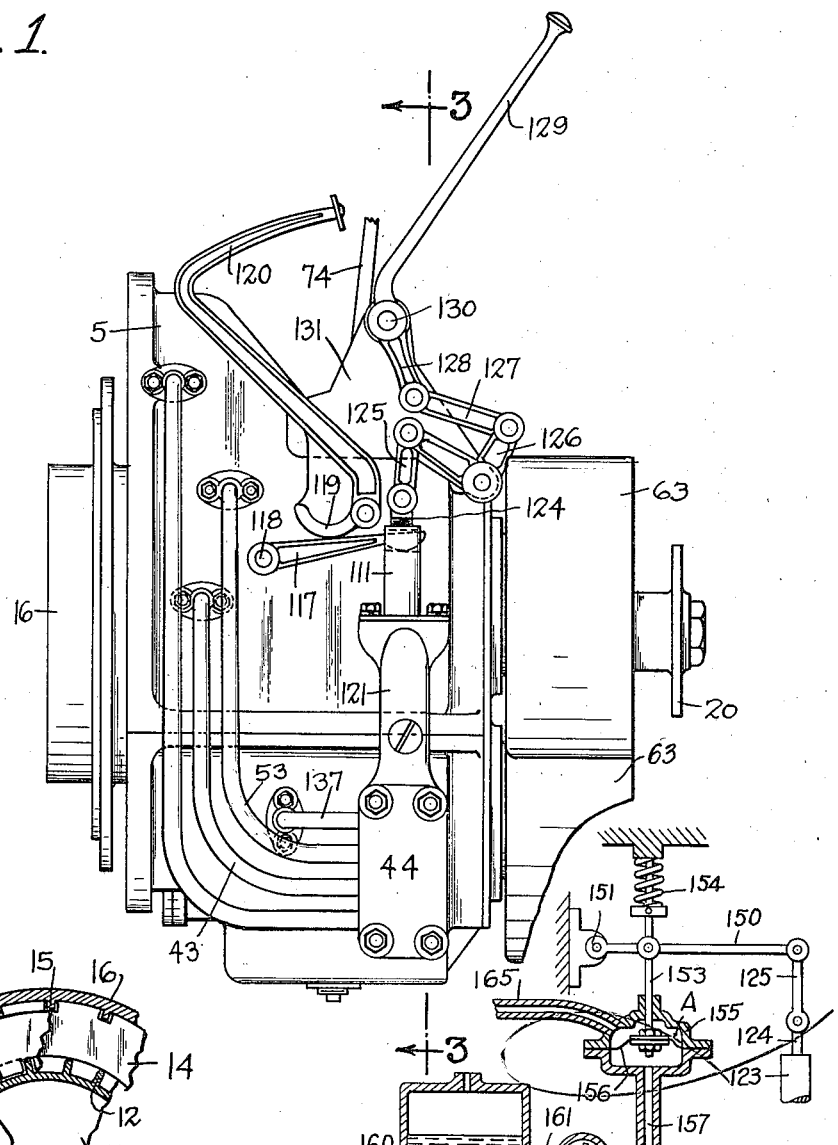

Oct. 29, 1935.  W. T. LIVERMORE  2,019,146
TRANSMISSION MECHANISM
Filed Oct. 22, 1929  3 Sheets-Sheet 3

Inventor
WILLIAM T. LIVERMORE
By His Attorney John J. Lynch

Patented Oct. 29, 1935

2,019,146

UNITED STATES PATENT OFFICE 2,019,146

TRANSMISSION MECHANISM

William T. Livermore, Westfield, N. J.

Application October 22, 1929, Serial No. 401,532

29 Claims. (Cl. 74—364)

This invention relates to vehicle transmission and in particular to a type in which the change of gear ratio is provided by mechanism having individual clutches for the various ratios.

The chief object of my invention is to provide a transmission, the ratio of which may be altered without as much loss of time in the operation of changing the gear ratio as is at present consumed in the standard type of construction and without the clashing of gears. Also, my improved mechanism provides a more nearly uninterrupted flow of power during acceleration of the vehicle and consequently requires less time to get the vehicle up to the desired speed.

Another important object of my invention is to substantially eliminate gear shifting to provide the speed ratios desired, the operation of providing the shift from one speed to another being very much simplified.

A further object of my invention is to provide a transmission particularly adapted for use in automotive vehicles in which the various gear ratios between the engine and rear or drive axle are controlled by individual clutches which cause the engine power to be diverted through the proper gears to obtain the desired ratio.

A still further object of my invention is to provide clutches which are controlled by pistons, bellows or the like which are actuated by fluid or air pressure, the gear change being accomplished by suitable operation of a valve which permits pressure to act upon the bellows corresponding to the desired change of gear ratio.

Other important objects of my invention as employed in a fluid pressure controlled transmission are, the use of dry plate clutches which are located exteriorly of the gear casing whereby they can be readily changed or otherwise operated upon without necessity of taking apart the transmission casing.

It is a further object of my invention to apply in a fluid or air pressure controlled transmission, bellows which are expandable under pressure to obtain the gear drive and clutch movement necessary in the change from one driving speed to another, and a separately operated clutch for use in connection with all of the gear ratio changes. I also employ a special valve for gradual pressure application to the bellows for admitting the fluid under pressure from an air cushioned compression chamber, these features all being combined to produce a gear operated mechanism or transmission unit which is silent in operation, convenient in use, reduces the wear and tear on the vehicle by eliminating quick, jolting starts or changes from one speed to another which is common in the manual gear shift employing levers.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 is a view in side elevation of a transmission casing and operating parts constructed in accordance with my invention.

Figure 6 is a fragmentary view in section illustrating the type of clutch employed in my mechanism.

Figure 7 is a diagrammatic view illustrating the means for automatically controlling the position of the control valve.

Figure 4:
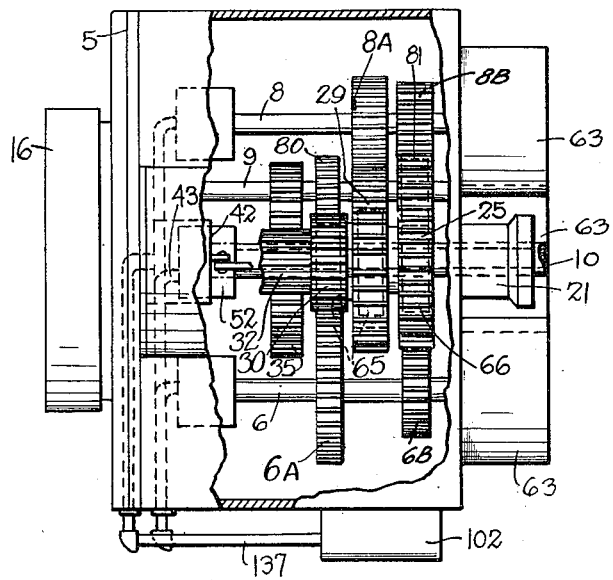
Figure 4 is a top plan view, the same being shown in section to illustrate the arrangement of the shafts and gearing.
Figure 2:
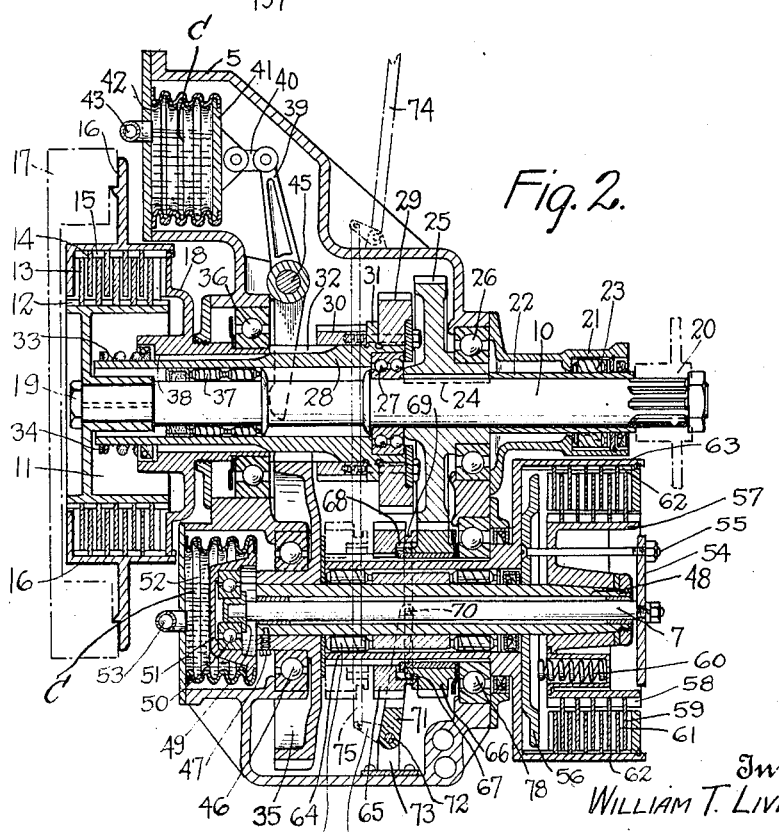
Figure 2 is a view in sectional elevation, the section being taken substantially on the line 2—2 of Figure 3 and showing the internal working parts of one set of gearing which illustrates the operation of my device.
Figure 3:
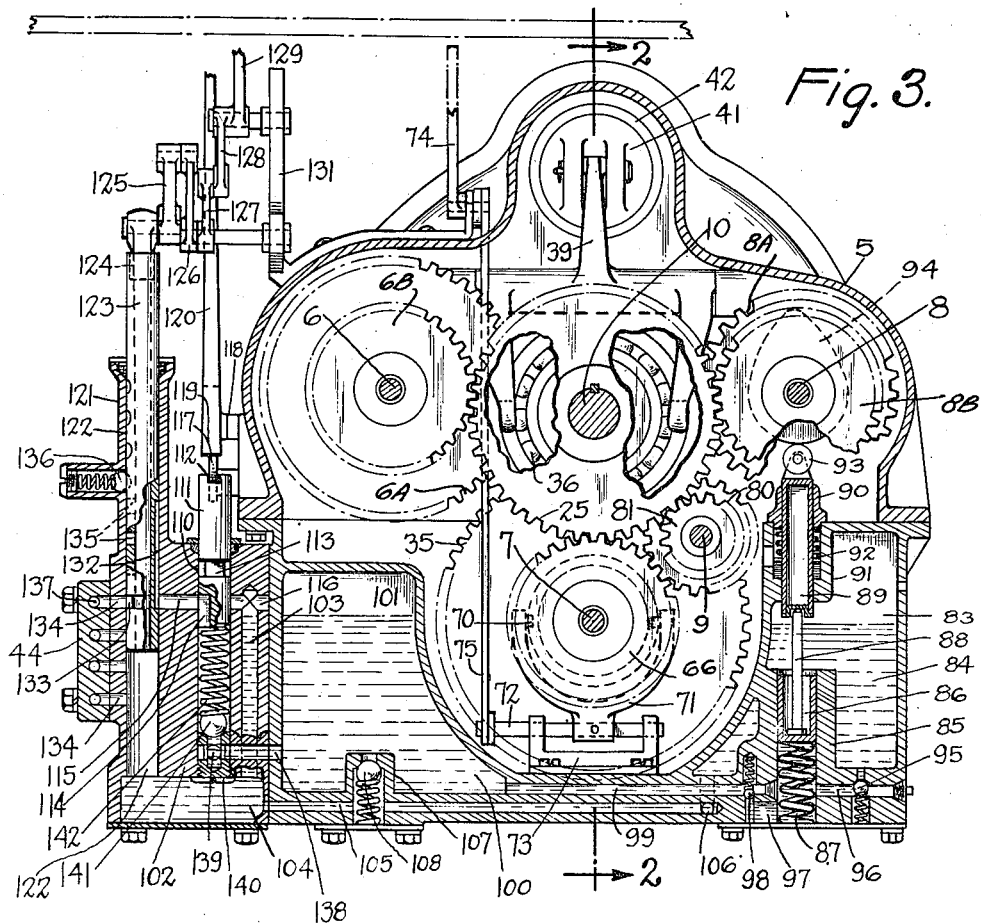
Figure 3 is a section taken substantially on the line 3—3 of Figure 1 and illustrates the gear shaft and gear arrangement through the medium of which the various speed ratios are obtained in the operation of a motor vehicle.
Figure 5:
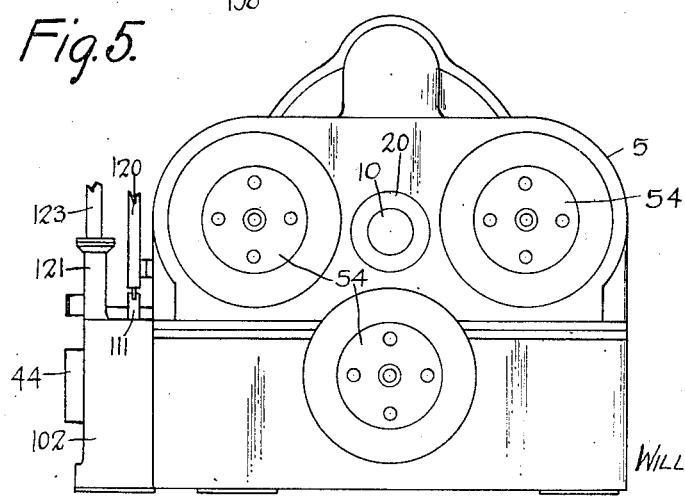
Figure 5 is an end view of the clutch and casing arrangement as illustrated in Figure 1.

Referring to the drawings in detail and in particular to Figures 2, 3 and 4; 5 indicates a gear casing in which is housed the various gear carrying shafts 6, 7, 8 and 9 and 10, the latter constituting the main drive shaft which, at one end has secured thereto exterior of the housing 5, the drum portion 11 of a clutch. The clutches as used in my construction are preferably of the dry plate type and make use of three or more plates or sufficient number of plates so that the load to be driven may be successfully accommodated by the plate area, the plates being multiplied in number to obtain the desired area. The drum 11 of the clutch is provided with suitable keys 12 over which slip the serrated, inner circumferences of the alternate plates or disks 13, the intermediate plates 14 being serrated on their outer circumference to engage the keys 15 provided on the inner wall of the clutch outer member 16 which, as illustrated in Figure 2 may be secured in any manner to the fly wheel 17 indicated in outline. The construction of the plates 13 and 14 is well known, they being so warped that they will have a tendency to spring apart when freed of pressure but are so arranged that they will have close contact and will afford a driving connection when pressure is applied thereto through the medium of a pressure disk 18 whose peripheral edge is offset so that it may pass between the clutch outer member 16 and the hub member 11.

Through the medium of the keys 12 and 15, a drive transmission is afforded from the fly wheel to the hub 11 and the hub being secured on the end of the shaft 10 through the medium of the nut 19 and a suitable key will cause constant operation of the drive shaft 10 while the motor of the engine is running constituting what is termed a direct drive, when the clutch disks are forced into contact with each other. One end of the shaft 10 is provided with a suitable flange member 20 which is secured to the propeller shaft of the vehicle. This end of the shaft 10 is journalled in an extended portion 21 of the casing 5 and extends through a bushing 22 operable within the roller bearing 23. The shaft 10 has keyed thereto as at 24, a driven gear 25, whose hub is journalled in the ball bearing 26 suitably mounted within the casing 5.

The shaft 10 supports adjacent the gear 25 a ball bearing 27 over which fits one end of a sleeve 28. This sleeve has secured thereto the gear 29 and the gear 30, these gears 29 and 30 being secured together through the medium of suitable bolts passing through the flange 31 formed on the sleeve 28.

The sleeve is provided with teeth 32 intermediate its ends and has splined thereto in the usual manner, the clutch member 18. The end of the clutch member 18 is engaged by the spring 33, the end of which is secured to or presses against a washer 34 held on the end of the sleeve 28 so that the clutch disk member 18 through the action of the spring 33 is held normally disengaged from the clutch plate 13 adjacent the disk 18. The outer peripheral edge of the clutch disk 18 is serrated to fit over the keys 15 provided in the fly wheel engaging portion of the clutch 16 so that this clutch disk member 18 may have longitudinal movement relatively to the parts 16 but is continuously driven thereby. The disk member 18 being splined to the sleeve 28 revolves the sleeve and with it, the gears 29 and 30, and through the medium of its teeth 32, drives the meshing gear 35 reference to which will be hereinafter made. The hub or extended portion of the disk 18 is journalled in the ball bearing 36 which is supported in a suitably shaped section of the housing 5.

The sleeve 28 is maintained in spaced relation with the shaft 10 through the medium of the roller bearing 37, in addition to the ball bearings 27 hereinbefore referred to. The member 18 being splined as at 38 to the sleeve 28 may have longitudinal movement thereon and this movement is accomplished through the medium of the forked lever 39 whose bifurcated end bears against the outer race of the ball bearing 36, the opposite end of the lever 39 being connected through the medium of the link 40 at the closed movable end 41 of the bellows 42. This bellows is of the usual metallic type, expandable under pressure, and fluid is led into the bellows 42 through the medium of the pipe 43, this pipe 43 being one of a series which connect the various bellows (used in the operation of the gears) which terminate in the block 102, see Figure 3, secured in any suitable manner to the housing 5 and its associated parts. The lever 39 being pivoted as at 45 when the bellows 42 are distended will, through the ball bearing 36, move the member 18 toward the left as seen in Figure 2 with the result that it will bring the plates 13 and 14 of the clutch together and thus transfer the drive or rather, cause a direct drive from member 16 through the hub portion 11 of the clutch to directly drive the shaft 10, the peripheral edge of the member 18 being notched and fitted over the keys 15 of the member 16 will be constantly driven. The direct drive, therefore is accomplished by inflation of the bellows to operate the clutch lever 39 so that the plates of the clutch are moved to contact with each other so that drive occurs between the parts of the clutch and directly through the shaft 10 to the connecting unit 20 carried on the outer end of the shaft.

In order that various changes of speed may be accomplished, I have made use of a construction which is substantially similar on the various shafts 6, 7 and 8 and it is not believed that a detailed description of all three of the shafts is necessary inasmuch as substantially all of the parts are identical and the operation of each of the shafts is identical in changing the speed of the vehicle.

As illustrated in Figure 2, the casing 5 is arranged to support the ball bearing 46 in which is journalled the hub of the gear 35 which meshes with the teeth 32 of the sleeve 28. The hub of the gear 35 through the medium of a key or connecting screw 47 is secured to the sleeve 48 which surrounds the shaft 7, the sleeve 48 being suitably spaced from the shaft by the use of suitable nipples or bushings. One end of the shaft 7 is provided with a bonnet 49 which fits within the ball bearing 50, the outer race being seated in a cap 51 which provides a closure for the bellows 52 which is similar to the bellows 42 and is provided with an inlet pipe 53 from which fluid under pressure is obtained for expanding the bellows 52 to cause longitudinal or endwise movement of the cap 51 and consequently through the ball bearings 50, longitudinal or endwise movement of the shaft 7. The opposite end of the shaft is provided with a plate 54 which is secured through the medium of bolts 55 only one of which is illustrated, with the disk member 56 of a clutch. The clutch consists of the hub portion 57 which is provided with the keys 58 which the disks or plates 59 engage, these disks being serrated on their inner circumference and so arranged that they may have sliding movement longitudinally on the keys 58 but are rotated thereby with the hub portion 57 of the clutch. This hub is provided with suitable springs 60 only one of which is illustrated, which normally maintain the disk 56 in spaced relation with the first set of plates 61 which are serrated on their outer circumference and are arranged to engage the keys 62 formed in the inner circumference or wall of the clutch drum 63. This drum 63 provides a housing for the clutch mechanism just described and is provided with a forwardly extending tubular portion 64 to which is splined the reversing clutch gear 65 and on which is carried the transmission gear 66, free to rotate on its bushing.

The gear 66 is provided with clutch teeth 67 which engage with the teeth 68 provided in an annular recess of the gear 65, this gear being also provided with an exterior groove 69 for the reception of the pins 70 which are carried by the upper, forked end of a gear shifting yoke 71; the yoke being suitably pivoted as at 72 in a bracket 73 secured to the bottom of the casing 5.

In Figure 2 the clutch or reversing gear 65 is indicated in the reverse drive position in outline, movement to this position being obtained through a suitable lever 74 positioned exteriorly of the casing 5 and arranged for connection through the medium of a link 75 to operate the rock lever 76 secured to the stub or pivot shaft 72 to which the yoke 71 is secured. The sleeve 64 is arranged to rotate independently of the tubular shaft 48 and is spaced therefrom through the medium of the roller bearings 77. The sleeve 64 is also journalled in the ball bearings 78 suitably secured in the housing 5. It will be noted that all of the clutches are disposed exteriorly of the housing or casing 5, whereby access thereto may be readily had.

As mentioned above the construction employed on shafts 6 and 8 is similar to that employed on shaft 7. Referring to Figs. 2 and 4 the hollow shaft 48 around shaft 6 carries gear 6A and the sleeve 64 around shaft 6 carries gear 6B, said gears 6A and 6B meshing with gears 30 and 25 respectively to transmit a second speed. Similarly the hollow shaft 48 around shaft 8 carries gear 8A and the sleeve 64 around shaft 8 carries gear 8B said gears 8A and 8B meshing with gears 29 and 25 respectively to transmit a third speed.

In the operation of the mechanism as described, the power derived from the fly wheel 17 constantly operates the member 16 of the clutch and continuously drives the member 18 of the clutch which is splined to the sleeve 28 and which in turn is meshed through the gear teeth 32 to the gear 35 so that in low speed drive, inflation of the bellows 52 will force the cap 51 toward the right in Figure 2 and the shaft 7 will be moved in the same direction with the result that the member 56 of the clutch combination will draw together the plates 59 and 61 and will transmit the drive from the hub member 57 of the clutch to the outer member 63 driving the sleeve 64 and with it, the gear 66 which meshes with the gear 25 on the shaft 10 so that the low speed drive is transmitted to the propeller unit 20. For second speed drive a similar fluid pressure actuated clutch unit 63 on shaft 6 effects driving connection between gears 6A and 6B, thereby causing the drive to go from main sleeve 28 through gear 30 to gear 6A (on hollow shaft 48 around shaft 6), to gear 6B and thence to gear 25 and shaft 10. For a third speed drive the fluid pressure actuated clutch unit 63 on shaft 8 effects driving connection between gears 8A and 8B thereby causing the drive to go from main sleeve 28 through gear 29 to gear 8A (on hollow shaft 48 around shaft 8) to gear 8B and thence to gear 25 and shaft 10. In a direct drive of the vehicle, expansion of the bellows 42 will rock the rock arm 39 with the result that member 18, as before mentioned will contact the plates 13 and 14 and cause drive directly through the hub member 11 to the shaft 10. For the reverse drive of the vehicle, the bellows 52 will be expanded and the drive will take place as before described in connection with the sleeve 64 to which is splined for sliding movement the clutch gear 65 which performs the reversing operation, when it is moved to the position shown in outline in Figure 2. The gear 65 being splined to the sleeve 64 driven thereby and in the position shown in outline, is in mesh with gear 80, see Figure 4, which is an idler gear and which, together with gear 81 is secured to the countershaft 9 journalled in the casing 5, the gear 81 meshing with and driving the gear 25 which is keyed to the shaft 10, it being understood that the interposition of the gear 80 between the gear 65 and the gear 25 will reverse the direction of rotation of the shaft 10.

When the reverse gear 65 is in its non-reversing position as indicated in the full lines in Figure 2, it meshes with the teeth 67 of the gear 66 and the reverse gear 65 being splined to the sleeve 64 will transfer the rotary motion of the sleeve 64 to the gear 66 to permit its drive of the gear 25.

Except for reverse operation, as explained above, no shifting of the gears is required to effect change in speeds. The gears for the respective forward speeds are in mesh at all times but the drive through each train is controlled by a separate clutch which effects required connections between the respective gear shafts and sleeves as described.

The casing is cast to provide a plurality of reservoirs and conduits, the main or supply reservoir being indicated in Figure 3 by the numeral 83 and being partially filled with any suitable fluid 84 which will serve the purpose of my invention. The reservoir 83 is provided with the pump cylinder 85 in which operates a piston 86, against the action of a spring 87. The piston 86 is connected by a rod 88 to the operating plunger 89 whose upper end slides through a bonnet 90 which is secured to the piston housing 91, in which housing is also encased a spring 92 which retains a packing in place. A cam roller 93 is carried in an extension of the plunger 89 and is held against a cam 94 by the pressure of the spring 87. The cam 94 is mounted on the shaft 8 and revolves therewith so that during the operation of the shaft 8, the pumping operation will be continuous and the reciprocations of the piston 86 will alternately draw the liquid 84 out of the reservoir 83, past the check valve 95, through the passage 96 and into the compression chamber 97 from whence on a downward movement of the piston 86, it will be forced out through the check valve 98 through the conduit 99 and into the compression chamber 100. In the compression chamber there will be provided an air cushion 101 which will facilitate ease in flow of the liquid when it is used in operating any of the various bellows in the operation of the vehicle.

A valve housing 102 is provided in the nature of a casting which may be secured in any suitable manner to the exterior of the casing 5 and which is provided with a vertical fluid bore 103 whose lower end opens into an auxiliary or discharge reservoir 104, this reservoir being connected through the medium of the conduit 105 and through a conduit 106 with the main reservoir 83. The conduit 105 opens into a check valve chamber 107 in which a spring operated check valve 108 is housed, this valve acting to regulate the pressure in the chamber 100 so that should the pressure of the fluid 84 therein become excessive, it will operate against the ball 108 and will find its way back into the chamber 83 through the conduit 106 or will overflow into the auxiliary or discharge reservoir 104, it being evident, of course, that the liquid in the reservoir 104 and in the vertical conduit 103 will assume the level of the liquid in the reservoir 83. The valve block 102 is provided with a vertical bore 110 in which operates the plunger 111. This plunger 111 is provided with a cross slot 112 in the upper end thereof and intermediate its ends, is provided with an annular groove 113, the purpose of which will be hereinafter described. The lower end of the plunger 111 is provided with a slot 114 which, when the plunger 111 is in its raised or normal position, will register with the horizontal bore 115 provided in the valve block 102. The continuation of the bore 115 on the opposite side of the plunger bore 110 is designated at 116 and joins the vertical bore 103 so that a clear passage is provided through the bore 115, 116 and 103 to the auxiliary or discharge reservoir 104, when the plunger 111 is depressed to bring the annular groove 113 into register with the bores 115, 116. Depression of the plunger 111 is performed through the medium of a rock arm 117 which is pivoted as at 118 to the casing 5, and is engaged by the cam portion 119 of a foot lever 120 which is also pivoted to the casing in any suitable manner. The valve block or housing 102 is provided with an upstanding, tubular extension 121, the bore 122 of which is arranged to receive the tubular or hollow plunger 123. The upper end of this plunger 123 is closed through the medium of a suitable plug 124 to which is pivoted, the link 125. The upper end of the link is connected to a bell crank 126 which, in turn, through the medium of a link 127 is operatively connected to the extended portion 128 of a hand lever 129, this hand lever being pivoted as at 130 on a bracket 131 which is secured to the casing 5. This bracket 131 also serves as a support for the bell crank 126.

Manipulation of the handle 129 will provide practically all of the gear change operations, the handle being shifted to raise and lower the plunger 123 so that a longitudinal groove 132 in the surface of the plunger moves down to permit flow of the liquid under pressure through the conduit 115 and through a circumferential groove 133 in the plunger 123 into any one of the feed bores 134 which open into the bore 122 and are also arranged to register with the openings 135 in the tubular plunger 123 which is open at the bottom. Assuming that the vehicle is to travel at a certain speed, the lever 129 is manipulated until the plunger 123 against the action of the spring detent 136 is moved until the annular groove 133 which opens into the longitudinal slot 132 of the plunger is opposite any one of the orifices 134 thus permitting flow of the liquid under pressure through the conduit 115 into the longitudinal slot 132 through the groove 133 into the orifice 134 and into any one of the conduits 137 which lead the liquid under pressure to the bellows. As indicated in Figure 3, the uppermost conduit 137 might be arranged to lead to the first or low speed bellows, while the next lowest conduit would lead to the second speed bellows, the next lowest, to the third speed bellows and the lowest to the high speed bellows which would be the direct drive, it being immaterial how the conduits are arranged because a certain operation of the hand lever 129 would produce the required result which would be standard.

In the operation of the plunger, the liquid is forced through the passageway 138 from the chamber 100 and through the passage 139 of the plug 140, the inner end of the plug forming a seat for the ball 141 which is retained in position by the action of the spring 142. The action of the spring and the ball is to control the application of the pressure to the bellows as the plunger moves upwardly. In the bellows there are provided air pockets or air cushions for easing the operation of the parts so that no jarring occurs in the changing of the speeds by reason of the change of gear ratio. The liquid under pressure passing through the bore 139 and past the ball 141 travels up in the bore 110 and through the slot 115, and the bore 114 and into the slot or groove 132, through the peripheral groove 133 and into the conduit in register with said groove 133.

Assuming that, as indicated in Figure 3, the upper conduit has been supplied with liquid and it is desired to change to another speed, the plunger 123 is depressed until the groove 133 is in register with the next lowest conduit and the liquid under pressure then enters the conduit but in the meantme, one of the openings 135 in the tube has come into register with the uppermost conduit or orifice 134 and has permitted back flow of the liquid from the bellows down through the hollow plunger 123 and into the auxiliary discharge reservor 104. In this manner, any of the parts may be operated in succession as rapidly as desired without the necessity of waiting until the gears have slowed down in their operation, which is necessary in the old type of sliding gear transmission.

An added feature of my invention is the use of the plunger 111 to disengage any clutch which may be engaged thus affording a convenience in coming to a sudden stop or in maneuvering when both hands are required on the wheel. Depression of the plunger 111 will bring the annular groove 113 into register with the conduits 115 and 116 with the result that pressure in any of the bellows would be released and the liquid therein would flow through the conduits 115, 116 and back into the auxiliary reservoir 104, through the conduit 103.

When the plunger has been depressed to release the pressure to disengage the clutch to which pressure has been applied, its release, in the absence of a spring valve as illustrated, would permit a sudden and uncontrolled application of pressure. The use of my valve permits the application of pressure in an amount governed by the distance the plunger is raised and it is therefore possible to partially engage a clutch with just sufficient pressure to carry out the desired maneuver.

With my improved transmission, control is through the medium of a hand lever which is moved from one notch to another, each notch controlling one gear ratio. Considerable time during which the engine cannot deliver its power is thereby saved as compared to the usual method of gear change and a more prompt and smooth acceleration is obtained. The use of air cushions C within the bellows provide a cushioning during application of the clutches. It is to be understood also that while I have shown bellows, pistons may be effectively employed or any means may be employed which take advantage of a pressure operating upon a moving part to throw clutches into operating position so that gears which are constantly in mesh will operate to provide the speed ratio desired.

I have also shown a reverse gear which is operated through a lever and which is applied after the same manner of a sliding gear arrangement but it is to be understood that this gear may also be shifted through the medium of the bellows, if desired.

It is also possible that instead of manual operation of the control valve, it may be operated automatically so that changes in engine torque or speed or both may apply the clutch, controlling the proper gear for any desired condition. The engine intake manifold vacuum would be one source of power available for this purpose and any means might be employed whereby the operator can disengage any clutch which may be engaged by depression of the plunger 111.

The most important objects of my invention, therefore, are the use of clutches that are controlled by pistons, bellows or the like, actuated by hydraulic pressure, the gear change being accomplished by manually operating a valve which permits fluid pressure to act upon the bellows or pistons corresponding to the desired gear ratio. I have also made use of a hydraulically controlled transmission in which dry plate clutches are employed together with air cushioned compression chambers.

It will also be noted that the clutches are disposed outside of the casing so that access thereto may be readily had and a compact construction is obtained. A special valve is employed for the gradual application of the pressure to the bellows.

Any means may be employed for lubricating the mechanism.

In Figure 7, the link 125 instead of connection through the links 126, 127 and 128 to lever 129, is joined pivotally to the end of a lever 150 pivotally secured at its opposite end to a fixed bracket 151. Intermediate its ends the rod 153 is pivoted to the lever 150 and moves the same to operate the valve 123. Upward movement of the rod 153 is yieldably resisted by the spring and collar combination 154 and the rod 153 passes into the diaghragm chamber 155 for connection to the diaphragm 156. Entering the chamber 155 below the diaphragm is the pipe 157, whose lower end contains a choke valve 158 and connection through pipe 159 to a fluid supply chamber 160. This chamber is connected with pipe 157 by another pipe 161, in which is positioned a gear pump 163 driven by a shaft 164 whose speed varies with the speed of the engine. The pump circulates fluid through pipes 161, 157 and 159 and choke 158 and the pressure on the diaphragm depends upon the adjustment of the choke and the speed of the pump. Diaphragm 156 is, therefor raised against the pressure of spring 154 depending upon the speed of the pump, to in turn operate the lever 150 and adjust the valve 123. The diaphragm chamber 155 receives the tube 165 above the diaphragm 156, which tube is a vacuum tube leading from the engine intake manifold. When the engine intake manifold vacuum increases or decreases pressure on the upper surface of the diaphragm varies, thereby altering the action of the diaphragm and its consequent operation of lever 150. Engine manifold vacuum decreases when engine torque increases. The position of the control valve 123 is determined by various combinations of engine torque and speed and when torque decreases it will require less pump speed to raise the valve 123 to a given position and vice versa.

While I have illustrated and described my invention with some degree of particularity, I realize that in practice various alterations therein may be made without departing from the spirit of the invention or the scope of the appended claims.

What I claim is:—

1. In a vehicle transmission mechanism, a longitudinally movable shaft, an inner sleeve, and an outer sleeve on said shaft, clutch members on said sleeves for transmitting drive from one sleeve to another, means associated with said shaft for uniting the clutch members upon a movement of said shaft, and a pressure operated member for moving the shaft.

2. In a vehicle transmission mechanism, a main drive shaft, a main drive sleeve, means for revolving the sleeve, a longitudinally movable auxiliary shaft, an inner sleeve, and an outer sleeve on said auxiliary shaft, a driving connection between the main drive sleeve and said inner sleeve, clutch members for operatively connecting the inner and outer sleeves, means carried by the auxiliary shaft for uniting the clutch members in driving relation upon a longitudinal movement of said shaft, means for moving said shaft longitudinally, and a driving connection between the outer sleeve and said main drive shaft.

3. In a mechanism of the character described, a plurality of longitudinally expandable chambers, a reservoir, a pump, means for actuating the pump, a pressure chamber into which liquid is forced by said pump from the reservoir, a valve housing having a conduit therein, a grooved valve for admitting fluid to the conduit, means for moving the valve to bring the groove into register with the conduit whereby discharge of the fluid through the conduit is permitted, a fluid diverting valve associated with said conduit, and passages connecting each of said chambers with said valve.

4. In a mechanism of the character described, a valve block having a pressure conduit and a valve bore therein, outlets from said block, a movable valve in the bore provided with a slot and a connecting groove, the slot being in register with the conduit, and the groove being arranged to register with any of said outlets upon selective movement of the valve, and means for moving the valve.

5. In a vehicle transmission mechanism, a driving sleeve, a main shaft, an auxiliary driving member, a main driving clutch, an auxiliary clutch, pressure operated means for actuating the main clutch whereby drive is directly through said main shaft, pressure actuated means for operating the auxiliary clutch whereby drive is through said driving sleeve, auxiliary driving member and main shaft, a casing in which said driving members are housed, and all of said clutches being exterior of said casing.

6. In a mechanism of the character described, a casing, a plurality of shafts in the casing, clutches on said shafts, a fluid pressure control member for each of said clutches, said control members being disposed within the casing and said clutch members being positioned exterior of said casing, a pressure pump, and a valve for selectively supplying fluid under pressure to the control members.

7. In a mechanism of the character described, a casing, a plurality of shafts in the casing, clutches on said shafts, driving connections between the shafts arranged in compact relation, a fluid pressure control member for each of said clutches, said control members being disposed within the casing with said drive connection and said clutch members being positioned exteriorly of said casing, a pressure pump, a valve for selectively supplying the fluid under pressure to the control members, and means in the valve for releasing the pressure upon a predetermined movement of said valve.

8. In a mechanism of the character described, a chamber in which liquid under pressure is stored, a valve housing having a valve bore connected to said chamber, a spring, a valve held by the spring for yieldably opposing the passage into the bore of the liquid under pressure, and means for altering the tension of said spring.

9. In a transmission mechanism, a main shaft, gears associated with the main shaft, a countershaft, gears associated with the countershaft and engaging the gears of the main shaft, a clutch on the main shaft for connecting the main shaft directly to the engine, a clutch on the countershaft for joining the countershaft gears to cause power to be transmitted through the countershaft gears to the main shaft, fluid operated means for applying pressure to the clutches, a valve for diverting the fluid to selectively apply pressure to either clutch and a second valve for releasing and applying pressure to the clutch selected by the first mentioned valve.

10. In a transmission mechanism, a main shaft, gears associated therewith, a countershaft, gears associated with the countershaft and engaging the gears of the main shaft, a clutch on the main shaft for connecting the main shaft directly to the engine, a clutch on the countershaft for joining the countershaft gears to cause power to be transmitted through the countershaft gears to the main shaft, fluid operated means for applying pressure to the countershaft clutch, a control member, and means for altering the pressure in accordance with the position of the control member.

11. In a transmission mechanism, a main shaft, gears associated therewith, a countershaft, gears associated with the countershaft and engaging the gears of the main shaft, a clutch on the main shaft for connecting the main shaft directly to the engine, a clutch on the countershaft for joining the countershaft gears to cause power to be transmitted through the countershaft gears to the main shaft, fluid operated means for applying pressure to the countershaft clutch, and means for yieldably opposing the application of pressure to the clutches.

12. In a transmission mechanism, a main shaft, gears associated with the main shaft, a countershaft, gears associated with the countershaft and engaging the gears of the main shaft, a clutch on the main shaft for connecting the main shaft directly to the engine, a clutch on the countershaft for joining the countershaft gears to cause power to be transmitted through the countershaft gears to the main shaft, fluid operated means for applying pressure to the clutches, a chamber partially filled with air and containing fluid under pressure, a valve for diverting the fluid to selectively apply the pressure to either clutch, and a second valve for releasing and applying pressure to the clutch selected by the first mentioned valve.

13. In a transmission mechanism of the character described, a clutch, fluid operated means for applying pressure to operate said clutch, a control member, and means for altering the pressure in accordance with the position of the control member.

14. In a vehicle transmission, a drive shaft, a countershaft, a gear mounted on said countershaft and driven from said drive shaft, a rod, a countershaft sleeve, clutch parts on said countershaft and said countershaft sleeve, a radially extending member on the rod, and means for moving the rod endwise to move the radially extending member to provide a driving connection between said clutch parts.

15. In a transmission of the character described, a plurality of clutches for establishing the drive through different gear ratios, means for selectively applying fluid pressure to the clutches and other means for releasing and reapplying said pressure to said clutches independently of said first means, thereby to interrupt and reestablish the driving connection.

16. In a vehicle transmission mechanism, a drive shaft, gears for transmitting drive to said shaft, a plurality of clutches for transferring drive from a source of power to said shaft, through said gears, and each through a different gear reduction, fluid operated means for applying pressure to the clutches, a valve for diverting the fluid to selectively apply pressure to any clutch and a second valve for releasing and applying pressure to the clutch selected by the first mentioned valve thereby to interrupt and re-establish the driving connection.

17. In a transmission mechanism, a plurality of clutches, a fluid pressure reservoir and means for continuously maintaining a supply of fluid under pressure therein, fluid operated means for applying pressure to the clutches, a valve for diverting the fluid to selectively apply pressure to a clutch and a second valve for releasing and applying pressure to the clutch selected by the first mentioned valve.

18. In an engine driven vehicle transmission, mechanism, a plurality of shafts, and gears for operatively connecting said shafts, individual clutches for operatively connecting said shafts through various gear ratios, fluid operated means for actuating the clutches, and means automatically responsive to changes in engine torque and speed for automatically selecting the clutches to be operated by said fluid operated means.

19. In a fluid pressure operated change speed transmission, a plurality of gear trains of different gear ratios, a fluid pressure system including a plurality of clutches for making each gear ratio effective, means for selectively directing fluid under pressure to each of said clutches and means for releasing the pressure on any clutch which is in engagement at any instant without releasing the pressure in the entire fluid pressure system and without disturbing the setting of said selective means.

20. In a vehicle transmission mechanism a driving shaft, a driven shaft, a clutch for effecting a connection between said driving shaft and said driven shaft, a movable member for operating said clutch, means for moving said member comprising an expandible unit defining a fluid pressure chamber having an inlet for admitting fluid under pressure thereto, said inlet communicating with said chamber at a point such that during admission of fluid to said chamber such fluid will seal said inlet against egress of air before said chamber is completely filled with fluid, thereby to provide an air cushion adjacent to said clutch for insuring a gradual application of pressure thereto and a fluid pressure supply system, including a separate air compression chamber co-operating with said air cushion to avoid jerky clutch action.

21. In a vehicle transmission mechanism a driving shaft, a driven shaft, a clutch for effecting a connection between said driving shaft and said driven shaft, a movable member for operating said clutch, means for moving said member comprising an expandible unit defining a fluid pressure chamber having an inlet for admitting fluid under pressure thereto, said inlet communicating with said chamber at a point such that during admission of fluid to said chamber such fluid will seal said inlet against egress of air before said chamber is completely filled with fluid, thereby to provide an air cushion adjacent to said clutch for insuring a gradual application of pressure thereto and a fluid pressure supply system for supplying fluid under pressure to said expandible unit.

22. In a power transmission, rotatable driving and driven members, a clutch for transmitting rotation from said driving to said driven members including clutch parts connected to said members, and means for moving said clutch parts into and out of engagement comprising an antifriction bearing having a non-rotative race and means engaging said race to transmit thrust thereto to hold said clutch parts in engagement.

23. In a change speed power transmission, a prime mover, a driving shaft and means for transmitting power from said prime mover to said driving shaft comprising a countershaft, a sleeve rotatably carried by said countershaft, a pair of continuously intermeshing gears connecting said sleeve and driving shaft, a gear train continuously connecting said countershaft in driving relationship with said prime mover, and clutch means between said countershaft and sleeve for causing power to be transmitted through said countershaft and sleeve to said driving shaft.

24. In a transmission mechanism, a prime mover, a driven shaft, a countershaft, a counter sleeve surrounding said countershaft, a gear train causing continuous rotation of said countershaft with rotation of said prime mover, gears connecting said counter sleeve with said driven shaft, and a clutch for connecting said counter sleeve with said countershaft.

25. In a mechanism of the character described a driving shaft, a driven shaft, a plurality of auxiliary shafts, auxiliary sleeves on each of said auxiliary shafts, a gear train between said driving shaft and each of said auxiliary shafts, a gear train between each of said auxiliary sleeves and said driven shaft, clutches for connecting each of said auxiliary shafts with its corresponding sleeve selectively as desired and automatic means for operating said clutches.

26. In a vehicle transmission mechanism, a main driving shaft, a clutch therefor, a driven shaft, driving connections between said shafts, an auxiliary clutch on said driven shaft, a sleeve driven by the clutch to provide driving action, a radially extending member constituting a part of the clutch and movable to provide through the auxiliary clutch a driving connection between said driven shaft and sleeve, a rod secured to the radially extending member and pressure operated means for moving said rod longitudinally.

27. A transmission mechanism of the character described, a clutch, fluid operated means for applying pressure to engage said clutch, a fluid pressure reservoir of the accumulator type, a conduit connecting said reservoir and said fluid pressure operated means, a valve in said conduit between said reservoir and said fluid operated means and a second valve in said conduit also between said reservoir and fluid operated means for graduating the pressure of the fluid passing through said conduit thereby to insure smooth clutch application.

28. In a fluid pressure transmission mechanism for an automotive vehicle having a prime mover, a driven shaft, a plurality of gear trains of different gear ratios interposed between said prime mover and driven shaft, fluid pressure operated clutches for making the different gear ratios effective and a fluid pressure pump in continuous driving relationship with said prime mover through certain of the members of said gear trains.

29. In an engine driven vehicle transmission mechanism, a plurality of shafts, and gears for operatively connecting said shafts, individual clutches for operatively connecting said shafts through various gear ratios, fluid operated means for actuating the clutches, differential means connected with an element of the engine the operating conditions of which vary in accordance with torque conditions and said differential means also connected with an element in geared relationship with the engine the variations of which are in accordance with changes in speed conditions thereby to automatically select the clutches to be operated by said fluid operated means in combined response to torque and speed conditions.

WILLIAM T. LIVERMORE. [L. S.]